United States Patent
Martin et al.

(10) Patent No.: US 6,950,007 B2
(45) Date of Patent: Sep. 27, 2005

(54) METHOD AND DEVICE FOR MONITORING ENABLEMENT OF AN ELECTRICAL APPARATUS CONNECTED TO A POWER GRID

(75) Inventors: Fabrice Martin, Montigny le Bretonneux (FR); Robert Froehlich, Bougival (FR); Yves Dherbecourt, Sceaux (FR)

(73) Assignee: Electricite de France Service National, Paris (FR)

(*) Notice: Subject to any disclaimer, the term of this patent is extended or adjusted under 35 U.S.C. 154(b) by 280 days.

(21) Appl. No.: 10/258,113

(22) PCT Filed: Apr. 17, 2001

(86) PCT No.: PCT/FR01/01173
§ 371 (c)(1),
(2), (4) Date: Feb. 19, 2003

(87) PCT Pub. No.: WO01/80398
PCT Pub. Date: Oct. 25, 2001

(65) Prior Publication Data
US 2003/0151491 A1 Aug. 14, 2003

(51) Int. Cl.$^7$ .............................................. G05B 19/00
(52) U.S. Cl. ...................................... 340/5.1; 340/5.28
(58) Field of Search ............................... 340/5.1, 5.28, 340/5.8, 310, 825.02, 870.09, 870.02, 870.03, 310.01, 825.3, 825.31, 825.34; 455/15; 379/104, 107

(56) References Cited

U.S. PATENT DOCUMENTS

| | | | |
|---|---|---|---|
| 4,427,968 A | | 1/1984 | York |
| 5,406,249 A | * | 4/1995 | Pettus .................... 340/310.06 |
| 5,691,715 A | | 11/1997 | Ouellette |
| 6,005,943 A | * | 12/1999 | Cohen et al. .................. 380/30 |
| 6,373,150 B1 | * | 4/2002 | Fuller .......................... 307/39 |

FOREIGN PATENT DOCUMENTS

| | | | |
|---|---|---|---|
| GB | 2 229 025 | 3/1989 | |
| GB | 2229025 | * 9/1990 | ............ G07C/11/00 |
| GB | WO-9603728 | * 2/1996 | ............ G08B/25/01 |
| WO | 96/03728 | 7/1995 | |
| WO | 96/18982 | 12/1995 | |
| WO | 98/17013 | 4/1998 | |
| WO | 00/05820 | 7/1999 | |
| WO | 00/34929 | 6/2000 | |

OTHER PUBLICATIONS

Menezes et al. "Handbook of Applied Cryptography"–Boca Raton,FL,CRC Press,US 1997—XP002165296—ISBN/0-8493-8523-7.

* cited by examiner

*Primary Examiner*—Michael Horabik
*Assistant Examiner*—Matsuichiro Shimizu
(74) *Attorney, Agent, or Firm*—DLA Piper Rudnick Gray Cary US LLP

(57) ABSTRACT

The invention concerns a method and a device for monitoring enablement of an electrical apparatus connected to a power grid. The method consists in: transmitting (A) from a specialised transmitter (ES) to the electrical apparatus (EA) a coded information message comprising an enablement information, in accordance with an enablement control code; and in receiving (B) by means of a receiver (R) equipping the electrical apparatus (EA) said information message. The latter is decoded (C) in accordance with specific enablement data integrated in the receiver (R) to generate decoded enablement data. The enablement of the electrical apparatus (EA) is granted (D, E) if the decoded data are in conformity with the integrated specific enablement data and enablement is refused (D, F) otherwise. The invention is useful for protecting electrical appliances against theft, for managing service delivery on a distant site, monitoring contractual terms.

16 Claims, 8 Drawing Sheets

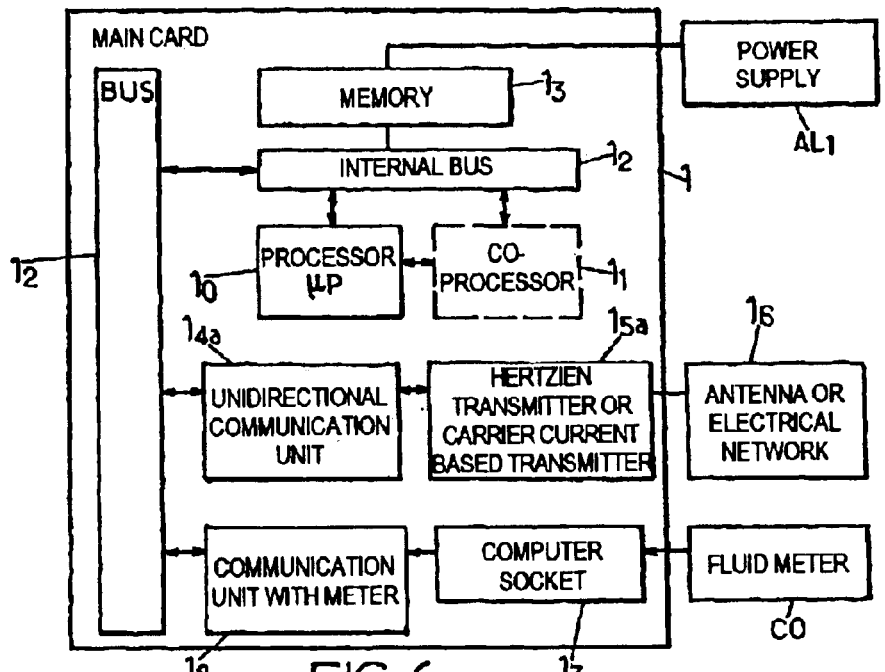
FIG.6a. MONODIRECTIONAL SPECIALIZED TRANSMITTER
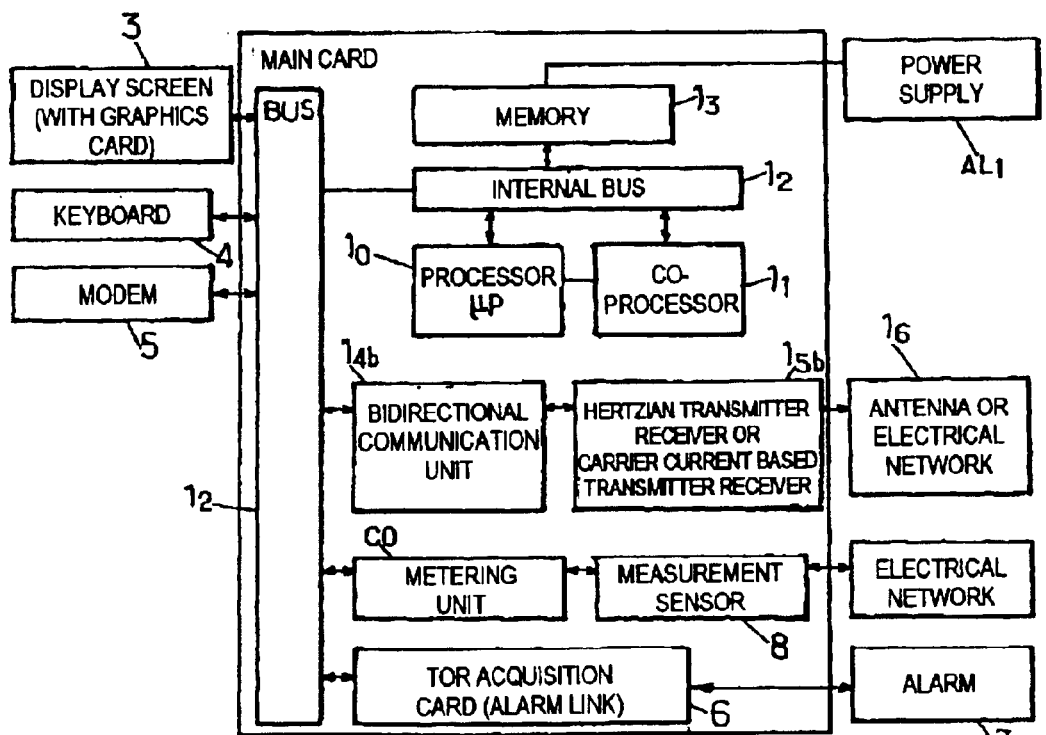
FIG.6b. BIDIRECTIONAL SPECIALIZED TRANSMITTER

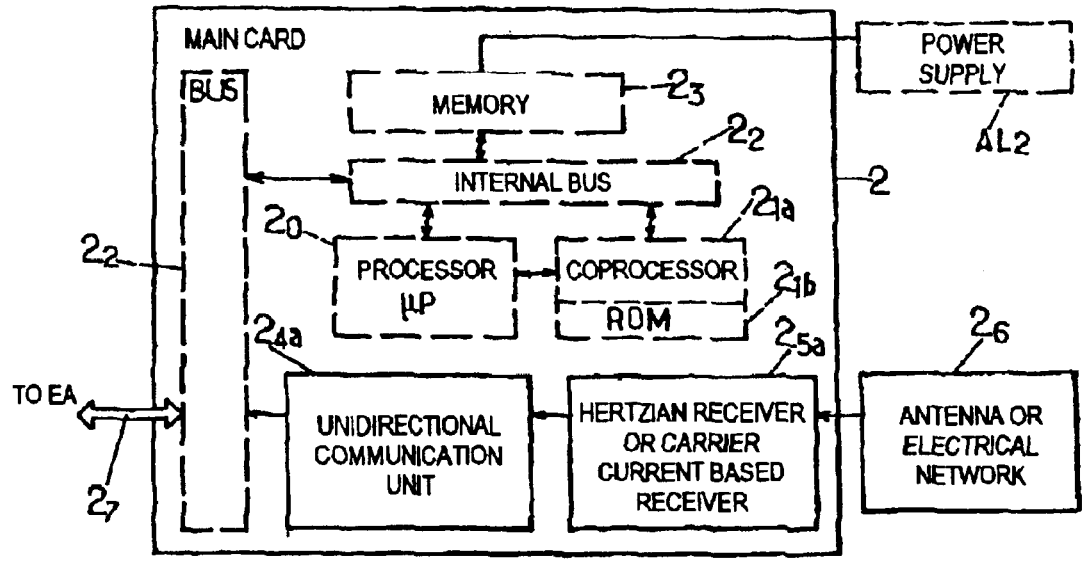
FIG. 7a. RECEIVER ASSOCIATED WITH AN ELECTRICAL APPARATUS (MONODIRECTIONAL)
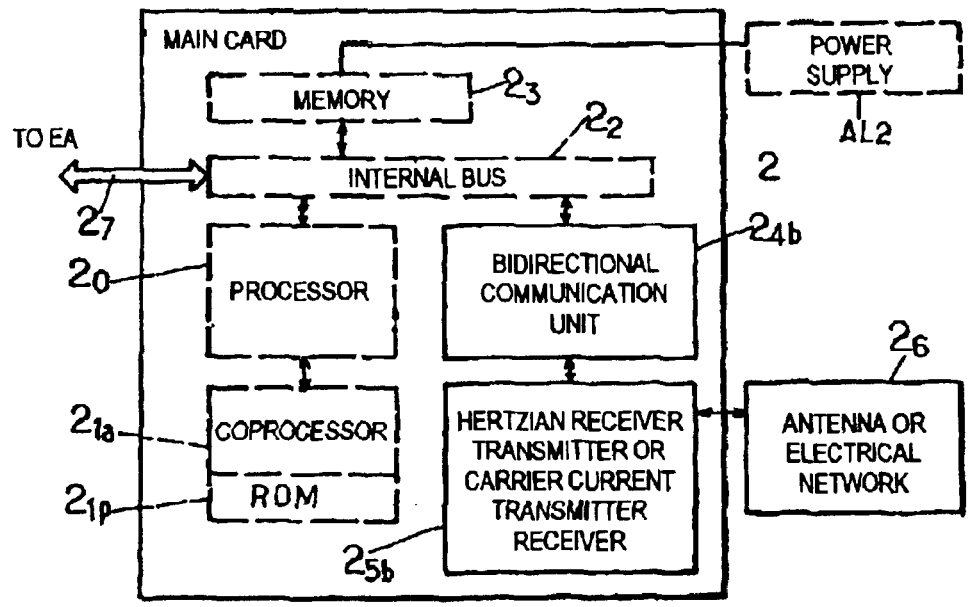
FIG. 7b RECEIVER ASSOCIATED WITH AN ELECTRICAL APPARATUS (BIDIRECTIONAL)

METHOD AND DEVICE FOR MONITORING ENABLEMENT OF AN ELECTRICAL APPARATUS CONNECTED TO A POWER GRID

FIELD OF INVENTION

The invention relates to a method and a device for monitoring authorization of an electrical apparatus connected, or coupled, to a network.

BACKGROUND OF THE INVENTION

At the present time, electrical kit is tending to ensure the execution of ever more diverse and varied functions or service provisions.

Such is the case in particular when this electrical kit consists of domestic electrical apparatuses referred to as brown goods, such as television receivers, radio receivers, video recorders, hi-fis, or white goods, refrigerators, washing machines of laundry, dishwasher or other type, or electrical apparatuses for the office or for domestic use, such as microcomputers and their peripherals, printers or the like.

For all these apparatuses, which represent a sizeable asset value for each user, the concept of authorization covers not only the concept of authorization of contractual origin for the execution of the function or of the service provision for which each apparatus is intended, but also the concept of authorization of legal origin for the execution of this function or of this service provision in favor of the legal custodian of the relevant apparatus, and not of any intruder who has purloined this apparatus or, as the case may be, the service provision access rights associated with this apparatus.

OBJECTS OF THE INVENTION

The object of the present invention is the implementation of a method and a device for monitoring authorization of an electrical apparatus connected to a network, allowing, in particular, the execution of a function for surveillance of the location of this electrical apparatus at a specified place in a surveillance perimeter, authorization of use of this apparatus being conferred upon this apparatus when the latter is situated at the aforesaid specified place in this surveillance perimeter, nonauthorization of use of this apparatus being conferred on the latter otherwise. In general, it is indicated that the concept of network, to which the electrical apparatus is connected, covers, on the one hand, the concept of communicating network, and, on the other hand, the concept of electrical energy distribution or supply network. Thus, the concept of communicating network covers any type of network making it possible to ensure the exchange of messages between the electrical apparatus and a specified site, such as an ATM or INTERNET network, GSM network in particular.

Likewise, the concept of electrical energy distribution or supply network for the electrical apparatus covers the residential network, downstream of the meter, the electrical distribution network upstream of the meter.

Furthermore, when the technology of communication by carrier currents generated on the electrical energy distribution or supply network is used, this electrical energy distribution or supply network constitutes, furthermore, a communicating network.

Another object of the present invention is also the implementation of a method and a device for monitoring authorization of an electrical apparatus furthermore allowing the execution of a function for surveillance of the use of this electrical apparatus with regard to one or more contractual undertakings of use with a view to a service provision, undertakings concluded between the user authorized to benefit from such a provision and any authorizing entity, creditor of this or these undertakings, the authorization of use of this apparatus being conferred on the latter when this use satisfies the undersigned contractual undertakings, the nonauthorization of use of this apparatus being conferred on the latter otherwise.

Among the envisageable applications of the monitoring method and device which are the subjects of the present invention, mention may be made in particular of the protection against the theft of the electrical apparatuses connected to a network, the monitoring of access to on-line services, in particular on payment of a subscription or within certain time slots, the execution of service provisions which are remote in relation to a central site.

SUMMARY OF THE INVENTION

The method for monitoring authorization of an electrical apparatus connected to a network, subject of the present invention, is implemented on the basis of a specialized transmitter of information messages, the electrical apparatus subjected to authorization being equipped with a receiver of information messages.

It "consists in" by the terms "comprises the steps of", consists in sending from the specialized transmitter to the electrical apparatus a coded information message comprising at least one coded authorization information item dependent on an authorization monitoring code, receiving this information message by means of the receiver with which the electrical apparatus is equipped, decoding this coded information message as a function of specific authorization data integrated into the receiver so as to generate decoded authorization information, instructing the authorization of this electrical apparatus if the decoded information satisfies the specific integrated authorization data, instructing the nonauthorization of this electrical apparatus otherwise.

BRIEF DESCRIPTION OF THE DRAWINGS

The method and the device for monitoring authorization of an electrical apparatus connected to a network, which are subjects of the present invention, will be better understood on reading the description and on looking at the drawings below in which:

FIG. 6a represents, by way of illustration, the architecture of a specialized transmitter in accordance with the subject of the present invention more particularly adapted to the sending of messages under monodirectional communication;

FIG. 6b represents, by way of illustration, the architecture of a specialized transmitter in accordance with the subject of the present invention and equipped with a receiver more particularly adapted to the sending and to the receiving of messages under bidirectional communication;

FIG. 7a represents, by way of illustration, the architecture of a receiver in accordance with the subject of the present invention and associated with an electrical apparatus, this type of receiver being more particularly adapted to the reception of messages under monodirectional communication transmitted, for example, by the specialized transmitter described in conjunction with FIG. 6a;

FIG. 7b represents, by way of illustration, the architecture of a receiver in accordance with the subject of the present invention and associated with an electrical apparatus, this type of receiver being more particularly adapted to the exchange of messages under bidirectional communication with a specialized transmitter equipped with a receiver such as described in conjunction with FIG. 6b.

The method or protocol for monitoring authorization of an electrical apparatus connected to a network in accordance with the subject of the present invention, will now be described in conjunction with FIG. 1 and the following figures.

In a general manner, it is indicated that the method which is a subject of the present invention covers all concepts of authorization of an electrical apparatus connected to a network and of course in operational mode, at least in standby mode, and allowing either the execution of a function for surveillance of the location of this electrical apparatus, or the execution of a function for surveillance of the use of this electrical apparatus with regard to one or more contractual undertakings or conditions of use with a view to a service provision, the authorization of use of this electrical apparatus being conferred on the latter when this use satisfies the undersigned contractual undertakings, and the non-authorization of this apparatus being conferred on the latter in the converse case. For the implementation of the method for monitoring authorization of an electrical apparatus, which is a subject of the present invention, it is indicated that this method can be implemented on the basis of a specific specialized transmitter, the electrical apparatus being equipped however with a receiver of information messages and, as the case may be, with a retransmitter making it possible to ensure the sending of response messages to the aforesaid specialized transmitter, the specialized transmitter and the electrical apparatus, and of course the receiver of information messages as well as the retransmitter being connected to one and the same network.

Network is understood to mean any type of communicating network and in particular any network consisting of one of the networks from the group local computer network, extended computer network, local Hertzian network, cellular radio telephony network and of course, nonlimitingly, electrical energy distribution network equipped with sending of messages by low-voltage carrier currents.

It is understood in particular that the aforesaid communicating network makes it possible, by virtue of the implementation of the method which is a subject of the present invention, to exchange messages between any authorized monitoring entity and at least one of the electrical apparatuses equipped with a receiver of information messages and also of course to exchange messages with the specialized transmitter of information messages allowing the implementation of the method which is a subject of the aforesaid invention.

Figure 1:
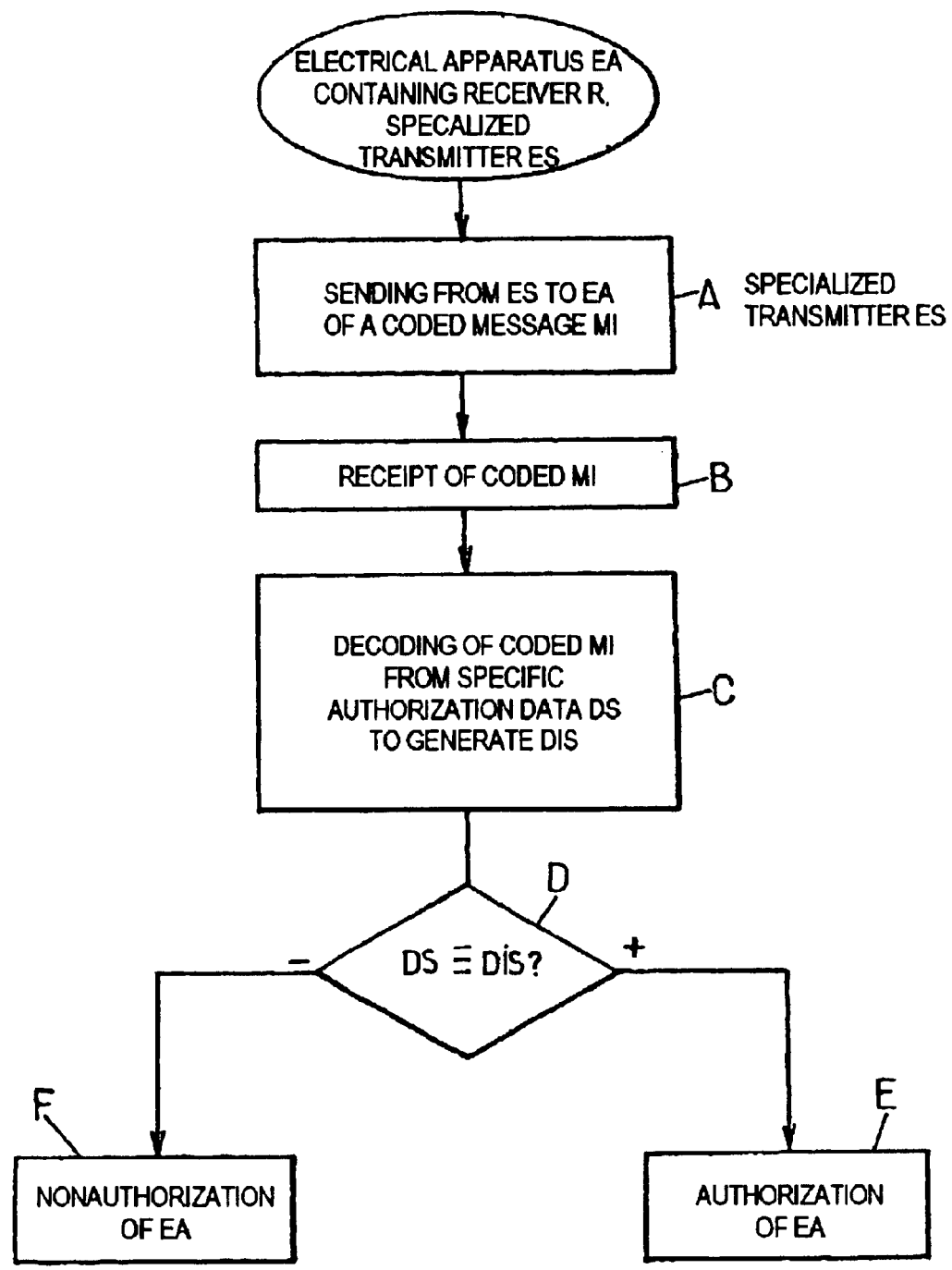
FIG. 1 represents, by way of illustration, a flowchart of the steps for implementing the protocol which is a subject of the present invention between a specialized transmitter and an electrical apparatus which are connected to a network.

With reference to FIG. 1, it is indicated that the following are thus available: an electrical apparatus EA containing a receiver R, fitted as the case may be with a retransmitter or localized transmitter EL, and with a specialized transmitter ES, which are connected by the aforesaid communicating network.

Under these conditions, the method for monitoring authorization which is a subject of the present invention consists, in a step A, in sending from the specialized transmitter to the electrical apparatus EA, a coded information message, denoted MI, comprising at least one coded authorization information item dependent on an authorization monitoring code, then, in a step B, in receiving at the level of the receiver R, by means of the latter, the aforesaid coded information message MI.

Step B is then followed by a step C, at the level of the receiver R, consisting in decoding the coded information message MI as a function of specific authorization data integrated into the receiver R so as to generate decoded authorization information, this decoded authorization information being denoted DIS.

Step C is itself followed, at the level of the receiver R, and hence of the electrical apparatus EA, by a test procedure D consisting in verifying that the decoded information DIS is identical to the specific authorization data DS integrated into the receiver R. Upon positive response to the test D, the authorization of the electrical apparatus EA is established in step E. On negative response to the test D, the nonauthorization of the electrical apparatus EA is instructed in step F.

Various indications relating to the authorization information coded as a function of an authorization monitoring code, this authorization monitoring code making it possible to define a monitoring or surveillance perimeter or zone for example, will now be given in conjunction with FIG. 2a.

MORE DETAILED DESCRIPTION

The concept of monitoring zone, or as the case may be of an authorization monitoring perimeter, should be understood as a zone which is not delimited hardware-wise but is defined at least by a set of monitoring codes which is assigned to a given electrical apparatus, this electrical apparatus being reputedly in the authorization monitoring zone allotted thereto if and only if this electrical apparatus, when the latter is connected to the communicating network, is capable of receiving only the monitoring codes corresponding to the set of monitoring codes which are assigned to it.

Figure 2A:
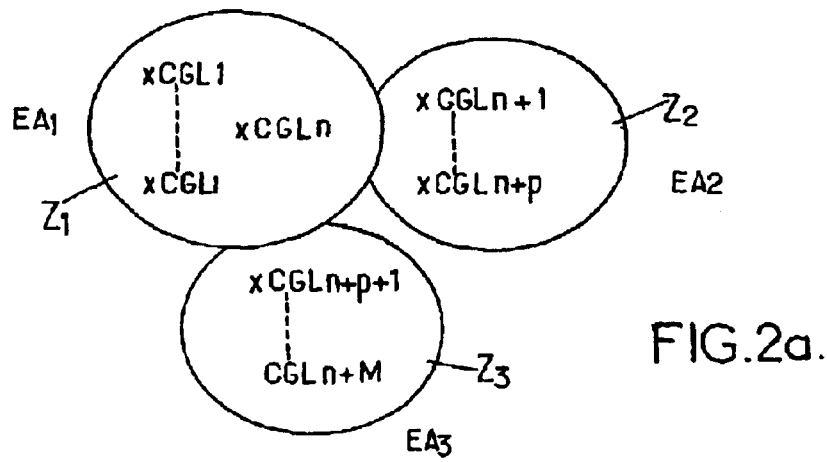
FIG. 2a represents, by way of illustration, a diagram defining an authorization monitoring zone or perimeter for any electrical apparatus connected to a network implementing the protocol which is a subject of the present invention.

Thus, for a given electrical apparatus EA, FIG. 2a shows that there is a zone $Z_1$ for an electrical apparatus $EA_1$, a zone $Z_2$ for an electrical apparatus $EA_2$ to which the authorization monitoring codes $CGL_{n+1}$ to $CGL_{n+p}$ have been assigned, and finally a zone $Z_3$ for an electrical apparatus $EA_3$ to which the authorization monitoring codes $CGL_{n+p+1}$ to $CGL_{n+M}$ have been assigned.

It is understood in particular that as a function of the geographical location, of the nature of the network and of each specialized transmitter capable of transmitting the authorization monitoring codes assigned to each aforesaid electrical apparatus $EA_1$ to $EA_3$, the set of monitoring codes assigned to each apparatus thus corresponds to a geographical location or surveillance zone.

In a general manner, it is indicated that step A of sending the coded message MI can be repeated periodically so as to ensure continuous surveillance of each electrical apparatus concerned.

The interruption of the periodic transmission of the coded messages MI can then advantageously be followed by an operation of lockup of the relevant electrical apparatus, as will be described in greater detail subsequently in the description, so as to avoid any attempted theft for example.

Figure 2B:
FIG. 2b represents, in an illustrative manner, a preferential particular form of the messages coded between an electrical apparatus and a specialized transmitter allowing the implementation of the protocol which is a subject of the present invention.

Thus, with reference to FIG. 2b, it is indicated that the authorization monitoring code $CGL_i$ can comprise at least one field containing a numerical value representative of a geographical location, under the conditions previously mentioned in conjunction with FIG. 2a, to which location the corresponding electrical apparatus EA belongs.

Furthermore, with reference to the same FIG. 2b, it is indicated that the authorization monitoring code can comprise at least one field, denoted CPH, containing a numerical value representative of a condition undersigned by the user, as will be described subsequently in the description.

A more detailed description of the method for monitoring authorization of an electrical apparatus connected to a network, in accordance with the subject of the present invention, will now be given in conjunction with FIG. 3a in a specific implementation making it possible to confer a high degree of security on the set of electrical apparatuses subjected to this method.

With this aim, it is indicated that each coded message MI is signed electronically, each signed message comprising a signed authentication data field making it possible, on verification of signature by the receiver R of the electrical apparatus EA, to decide whether this verified and decoded information satisfies the specific authorization data integrated into the receiver R.

Figure 3A:
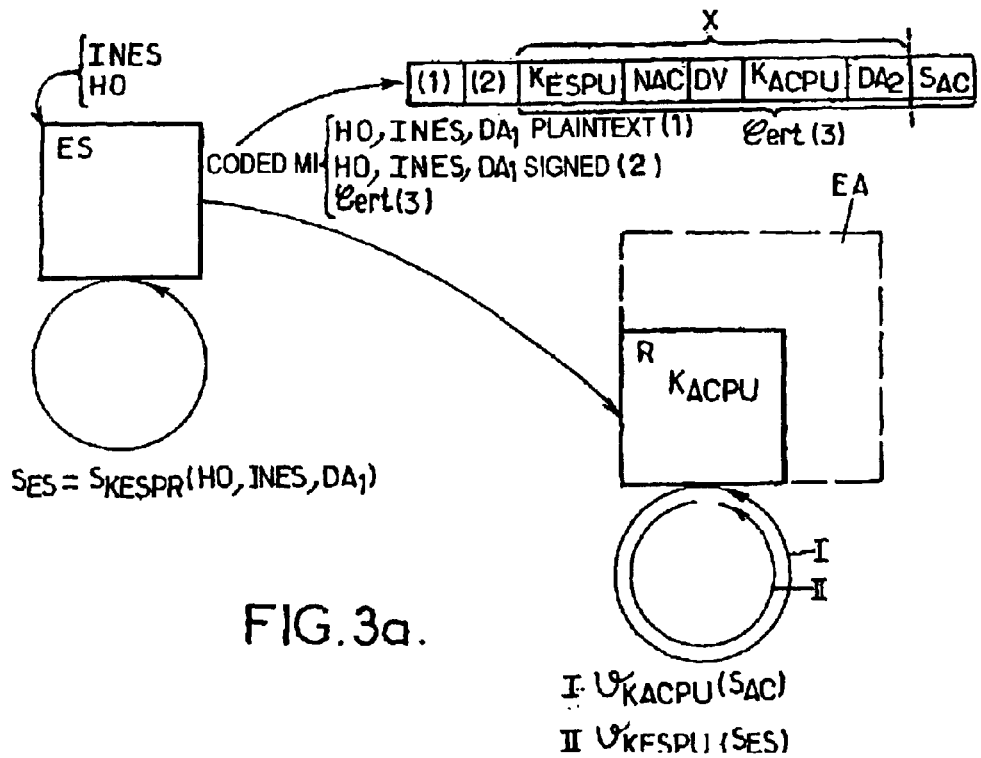
FIG. 3a represents, by way of illustration, various signature and signature verification processes implemented within the framework of the protocol which is a subject of the present invention by the specialized transmitter respectively by an electrical apparatus connected to a network.

With reference to the aforesaid FIG. 3a, it is indicated that the specialized transmitter ES possesses a secret which makes it possible to authenticate the coded messages MI which it transmits and thus avoids the construction and the operation of a pirate specialized transmitter, by emulation on a portable computer for example.

The mode of procedure which will be described hereinbelow in relation to FIG. 3a advantageously pertains to a specialized transmitter ES ensuring periodic broadcasting of coded messages MI constituting authentication messages on which the receivers R can react depending on the nature of the services which are to be executed.

The mode of procedure in the case of FIG. 3a corresponds to a monodirectional mode of operation for example.

In a general manner, the assembly is subjected to the monitoring of a certifying authority AC furnished with a private key $K_{ACPR}$ and with a public key $K_{ACPU}$. Each specialized transmitter ES is furnished with the following information:

information specific to the specialized transmitter ES by construction;

unique identification number delivered by the constructor of the specialized transmitter ES, this number being represented in FIG. 3a by the reference INES;

time stamping value, denoted HO, corresponding to the date and time delivered by a clock circuit of the specialized transmitter ES. The time stamping values HO can be coded in the form YY, MM, DD, HH, min, SS, CC, where YY denotes the year, MM denotes the month, DD denotes the day, HH denotes the hour, min denotes the minutes, SS denotes the seconds and CC the hundredths of seconds.

Furthermore, each specialized transmitter ES is furnished with a signature calculation module making it possible to calculate the signed value of data of the coded message MI on the basis of a signature system with private key $K_{ESPR}$, public key $K_{ESPU}$ specific to each specialized transmitter ES. Thus, an operation of calculating signature INES, HO and as the case may be auxiliary data $DA_1$ can be carried out advantageously at the level of each specialized transmitter ES, this signed value calculation operation being denoted:

$$S_{ES} = S_{KESPR}(HO, INES, DA_1)$$

and represented for this reason by a closed-loop arrow, the signed value calculation operation being performed at the level of the single specialized transmitter ES. The auxiliary data $DA_1$ can consist of specific data, which will be made explicit subsequently in the description.

As far as the parameters for calculating the signature are concerned, this signature value can be calculated from the private key $K_{ESPR}$, the public key $K_{ESPU}$ being able to serve to verify the signed value, as will be described subsequently in the description. The fields subjected to signature thus comprise the identification number INES of the specialized transmitter, the time stamping value HO and as the case may be the auxiliary data $DA_1$.

It is thus understood that the signed value (2) obtained constitutes an electronic signature of the aforesaid plaintext information (1). Furthermore, each specialized transmitter ES is furnished with a plurality of authorization data such as the public key of the specialized transmitter, $K_{ESPU}$, the name of the certifying authority NAC, the date of validity DV of the public key, the public key $K_{ACPU}$ of the certifying authority and auxiliary data $DA_2$, constituting the data field X.

Finally, these authorization data comprise a signature $S_{AC}$ of the aforesaid data. The signature $S_{AC}$ is calculated by the certifying authority AC and installed in the memory of each specialized transmitter ES with the data field X. The signature $S_{AC}$ satisfies the relation:

$$S_{AC} = S_{KACPR}(X)$$

where $S_{KACPR}$ denotes the operation of signature on the basis of the private key $K_{ACPR}$ of the certifying authority.

Other parameters may be integrated into the calculation of the signature value $S_{AC}$, such as for example a parameter indicating the version of the specialized transmitter ES and the length of the messages transmitted for example, in the guise of the auxiliary data $DA_2$.

The calculation of the signed value $S_{ES}$ represented in FIG. 3a at the level of the specialized transmitter ES is then performed advantageously before each transmission of coded periodic message MI.

Thus, with reference to the aforesaid figure, this message is sent and comprises at least the time stamping information HO and the information regarding the identification number INES of the specialized transmitter ES sent as plaintext, as well as the time stamping information HO and the information regarding the identification number INES subjected to the signature operation, as well as the set of data X and $S_{AC}$ constituting a certificate Cert containing the following plaintext information:

the public key $K_{ESPU}$ of the specialized transmitter ES, the name NAC of the certifying authority, the date DV given in the form previously indicated in the description, as well as the public key $K_{ACPU}$ of the certifying authority, auxiliary data $DA_2$, as the case may be.

Furthermore, a field relating to an item of information regarding the version of the specialized transmitter ES and the length of the messages transmitted may be provided, these data constituting for example the aforesaid auxiliary data. In the latter case, free bytes are furthermore added so that the message is the length announced in the version info field.

On receipt of the coded message MI, the receiver R can proceed, as represented in FIG. 3a, to a first operation of signature verification, denoted $\Theta_{KACPU}$, by means of the public key $K_{ACPU}$ of the aforesaid certifying authority. In a variant embodiment, it is indicated that the receiver can send the coded message MI to a remote server adapted for performing the aforesaid signature verification operation. In FIG. 3a, the signature verification operation when it is performed at the level of the receiver R is denoted:

$$\Theta_{KACPU}(S_{AC})$$

and represented by a first closed-loop arrow (I), this operation being carried out at the level of the receiver R. In normal mode, the value of the public key $K_{ACPU}$ used in the operation I has been configured previously in the receiver R, according to a preferential mode; however, in simplified mode, it will be possible to use the value of the public key $K_{ACPU}$ contained in the message MI. By virtue of the aforesaid signature verification operation I, the receiver R can then proceed, on the one hand, to a verification of the authenticity of the data of the data field X, including in particular the public key $K_{ESPU}$ of the specialized transmitter ES issuing the coded message MI, for the true value of the aforesaid signature verification, as the case may be to a verification of the value of the public key $K_{ACPU}$, when the receiver R is furnished, beforehand, with this value, then, on the other hand, on the basis of the value of the public key $K_{ESPU}$ of the specialized transmitter ES, the value and authenticity of which have been verified, to a second operation II of signature verification of the signed value HO, INES, $DA_1$, this operation being denoted:

$$\Theta_{KESPU}(S_{KESPR(HO,INES,DA1)}) = \Theta_{KESPU}(S_{ES}).$$

This second verification operation II is represented by a second closed loop II at the level of the receiver R.

This process makes it possible to establish that the time stamping information plus identification number of the specialized transmitter INES are valid and have indeed been subjected to signature by means of the private key $K_{ESPR}$ associated with the public key $K_{ESPU}$ of the specialized transmitter, included in the certificate Cert.

The mode of procedure of the previously described method which is a subject of the present invention does not depend in any way on the manner in which the pairs consisting of public key, private key of the certifying authority AC or of each specialized transmitter ES have been constructed. By way of nonlimiting example, the signature algorithm can be the RSA algorithm known as such and applied either directly to the data to be signed, or to a digest of these data which is calculated by applying a hash function to these data. By way of nonlimiting example, the algorithm used in the hash function may be the MD5 algorithm, known as such. The pair of keys $K_{ESPR}$, $K_{ESPU}$ may be common to several receiver transmitters ES. However, when the private key $K_{ESPR}$ is compromised, the level of security of all the receiver transmitters concerned is then jeopardized. It is therefore preferable for each of the receiver transmitters ES to be furnished with a pair of keys so as to limit the risk of compromise.

As far as the implementation of the specialized transmitter ES is concerned, it is indicated that the certificate part Cert delivered by the transmitter thus defines the quality of the authentication afforded by the relevant specialized transmitter.

This certificate can be included on construction, the certifying authority AC being either independent, or the constructor himself.

The certificate Cert can moreover be included in each specialized transmitter ES by the operator for setting up this specialized transmitter.

A more detailed description of a specific implementation of the method which is a subject of the present invention as illustrated in FIG. 3a will now be given in conjunction with FIG. 3b in a more particular case in which the specialized transmitter ES is associated with a metering device, such as an electricity meter for example.

Under these conditions, and in accordance with an especially noteworthy aspect of the method which is a subject of the present invention, the meter CO delivers to the specialized transmitter ES a unique identification number, denoted NCO, delivered by the constructor of the meter, as well as an index ICO representative of the consumption recorded by the meter.

Under these conditions, the coded message MI is made up of the same elements as those described in conjunction with FIG. 3a but to which are added, on the one hand, the meter number and, on the other hand, the meter index, that is to say the information representative of the consumption effected by the subscriber, as the case may be by the electrical apparatus EA. The meter number NCO and index ICO information is introduced both at the level of the plaintext part of the message and of the signed part thereof, in the guise of the auxiliary data $DA_1$ for example.

After receipt of the coded message MI by the receiver R, the signature verification operations I and II are carried out in the same way as in the case of FIG. 3a.

However, and according to an especially advantageous aspect of this embodiment, the receiver R, after the aforesaid signature verification operations, makes it possible to ensure that the meter number and index information is valid and has indeed been enciphered by the private key $K_{ESPR}$ corresponding to the public key $K_{ESPU}$ of the specialized transmitter ES, included in the certificate Cert.

The authentication of location is then complete when the relation is effected between the meter number NCO and the location of this meter on the distribution network where as the case may be the identity of the subscriber customer.

It is indicated in particular that the presence of the time stamping values HO, as the case may be of the metering index ICO, these being monotonic increasing time-dependent values, in the message MI and in the signature $S_{ES}$ makes it possible to avoid the fraudulent replay of a message MI with a view to simulating the presence of a specialized transmitter ES.

Figure 3B:
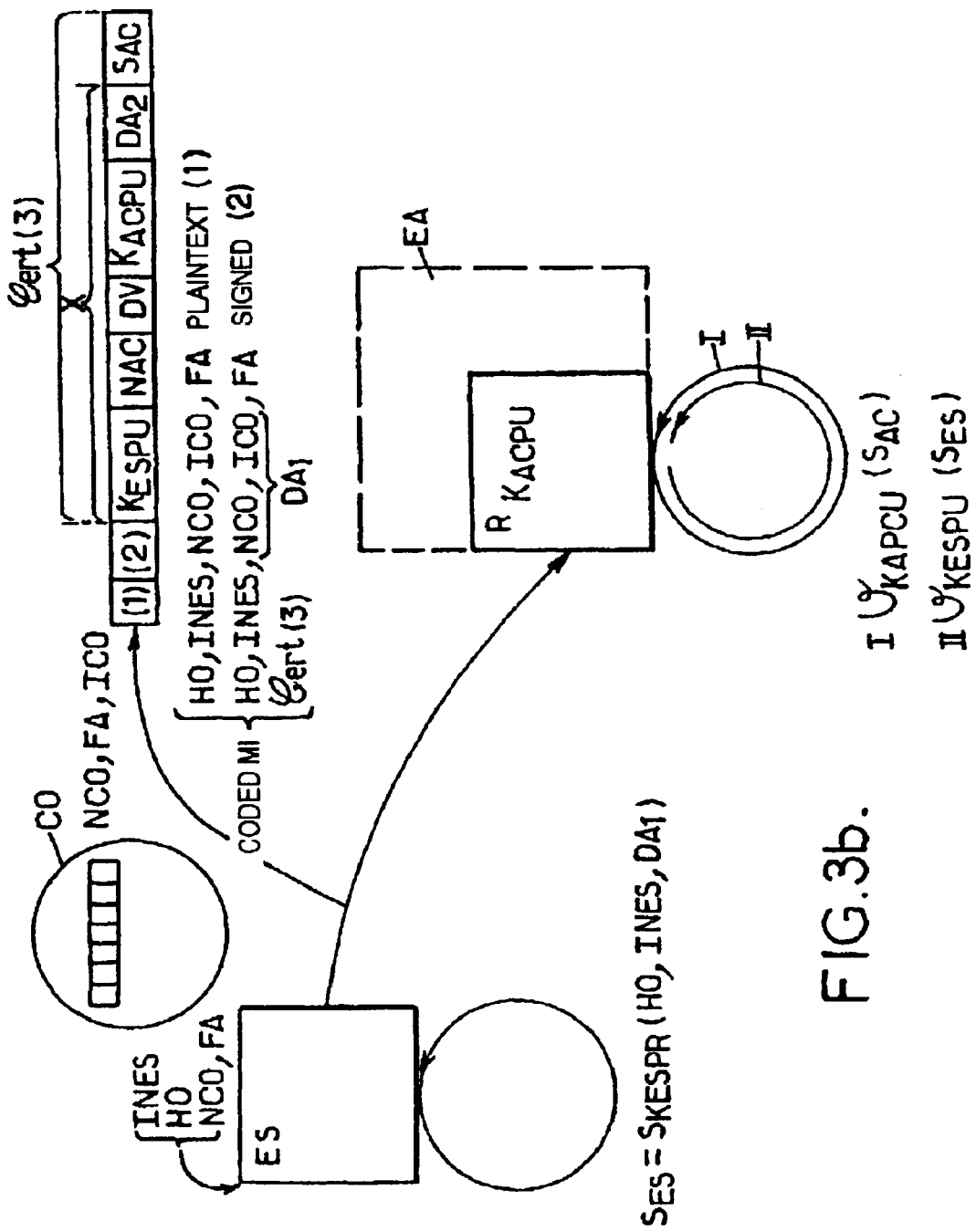
FIG. 3b represents, by way of illustration, various signature processes implemented within the framework of the protocol which is a subject of the present invention by the specialized transmitter respectively by an electrical apparatus connected to a network, in the more specific case where the electrical apparatus makes it possible to ensure, at a subscriber's, a service provision tied to the supplying of a fluid or of an energy supply.

Finally, and in a variant execution of implementation of FIG. 3b, it is indicated that each coded information message MI can also comprise at least one data field representative of a duration of authorization of use of the electrical apparatus. In the aforesaid FIG. 3b, this duration of authorization is denoted FA. It may preferably correspond to a start date and an end date of subscription which are stored in the electrical circuits of the meter CO for the electrical apparatus EA or, as the case may be, for a group of electrical apparatuses which is managed by the meter CO. In such a case, the duration of authorization of the electrical apparatus, that is to say the field FA, is advantageously integrated into the coded information message MI, both in the plaintext part and in the signed part thereof. The duration of authorization may also be limited to the time interval separating the transmission of a new authentication message, from an earlier authentication message.

A more detailed description of various alternative embodiments of the method which is a subject of the present invention will now be given in conjunction with FIGS. 4a and 4b.

In a general manner, it is recalled that the method which is a subject of the present invention can be implemented either in a monodirectional manner by the sending of coded information messages MID from the specialized transmitter ES to the receiver R of the relevant electrical apparatus EA, or on the contrary in a bidirectional manner, an exchange between a relevant specialized transmitter ES, fitted with a receiver RES, and the electrical apparatus EA then fitted with a localized transmitter, denoted EL, then being instituted.

Figure 4A:
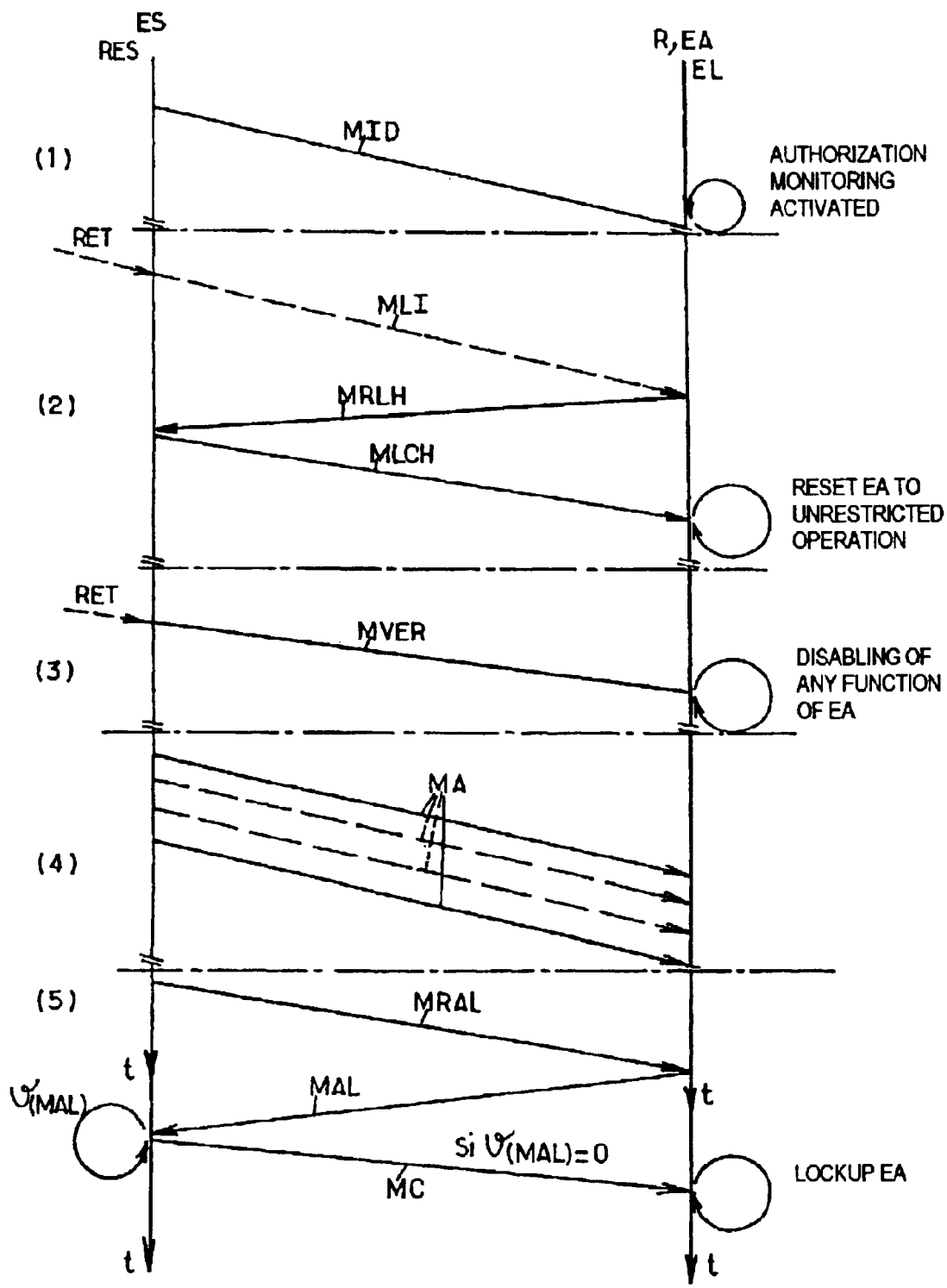
FIG. 4a represents, by way of illustration, various exchanges of messages between a specialized transmitter and an electrical apparatus which are connected to a network, the mode of exchange of these messages being monodirectional or bidirectional.

Represented in an illustrative manner in FIG. 4a is the exchange of information messages between the specialized transmitter ES and the electrical apparatus EA, the information messages of different nature being a priori sent asynchronously according to a monodirectional exchange or, as the case may be, upon a protocol for bidirectional exchange of information messages between the specialized transmitter ES and the electrical apparatus EA, that is to say, on the one hand, the receiver R and, on the other hand, the corresponding localized transmitter EL, on prompting by the specialized transmitter ES under the conditions which will be made explicit hereinbelow.

It is understood in particular that the aforesaid bidirectional exchange, when the latter is carried out on prompting by the specialized transmitter ES, in fact makes it possible to monitor the protocol for exchanging information messages between the aforesaid specialized transmitter and each electrical apparatus EA on the basis of the sole aforesaid specialized transmitter.

In a more particular manner, it is indicated that the exchange of messages of diversified functions may exhibit either a monodirectional character, or on the contrary a bidirectional character when the function carried out at the level of the electrical apparatus EA so requires, as is illustrated in FIG. 4a. For this reason, and in the aforesaid figure, it is indicated that the various messages, exhibiting and making it possible to carry out miscellaneous functionalities and in particular the exchanging of these messages between the receiver transmitter ES and the electrical apparatus EA so as to carry out each diversified function, are separated by dashed lines.

With reference to the aforesaid figure, it is indicated that the method for monitoring an electrical apparatus EA in accordance with the subject of the present invention can consist in sending, from the specialized transmitter ES to the receiver R of this electrical apparatus, an initialization message, denoted MID, comprising at least the specific integrated authorization data mentioned previously in the description. It is indicated that this sending can be of monodirectional type, so as not to overload the network with acknowledgement of receipt messages. The sending of the initialization message MID is represented at the point (1) of FIG. 4a. In a manner known as such, following the receipt of the specific integrated authorization data by the receiver R of the electrical apparatus EA and following verification of these data by this apparatus, a positive response to this verification, the receiver R having been installed beforehand in standby mode, makes it possible to activate all the functions of the receiver R, and as the case may be of the localized transmitter EL with which the electrical apparatus EA is equipped, so as to ensure various functions which will be made explicit in conjunction with points (2) to (5) of the same FIG. 4a.

Furthermore, as represented at the point (2) of the aforesaid figure, the method which is a subject of the present invention can comprise a step consisting in sending on request from the receiver R, from the specialized transmitter ES to this receiver R, a message MLCH for removal of monitoring of authorization of the electrical apparatus EA, the receiver R and the electrical apparatus EA, on receipt of the authorization monitoring removal message, then being reset to unrestricted operation.

In the embodiment represented in FIG. 4a at the point (2) thereof, the localized transmitter EL of the electrical apparatus EA delivers, to the receiver RES of the specialized transmitter, an authorization removal request message, MRLH, following prompting by the specialized transmitter ES, which has previously addressed a removal information message, denoted MLI, to the receiver R of the electrical apparatus EA. This removal information message has itself been sent by the specialized transmitter ES by way of a request transmitted by a third party, request denoted RET. This third party is of course a trusted third party or an authorized management body, as will be described subsequently in the description. It is understood in particular that the request message RET may be conveyed by a network distinct from the communicating network, to which the specialized transmitter ES and the electrical apparatus EA as well as the receiver R and the localized transmitter EL with which the latter is equipped are connected. It is indicated however that the request RET may be made secure by a process for authenticating the trusted third party, by a conventional authentication process, which, for this reason, will not be described in the description. A simplified process can consist in subjecting the request RET to a code for access to the relevant specialized transmitter ES. This security process makes it possible to avoid any usurping of the identity of the trusted third party.

Following the receipt of the authorization monitoring removal message MLCH by the receiver R of the electrical apparatus EA, a procedure for resetting the electrical apparatus EA into unrestricted operation is run internally, as represented in FIG. 4a at the point (2) thereof.

Furthermore, the method which is a subject of the present invention can consist, as illustrated at the point (3) of FIG. 4a in sending to the receiver R of the electrical apparatus EA, from the specialized transmitter ES and on request from a third party element, trusted third party defined for the monitoring perimeter and ensuring surveillance of this monitoring perimeter, a message of on-site blocking, denoted MVER, of the electrical apparatus EA. The receipt of the message for blocking MVER on the site of the electrical apparatus EA then makes it possible internally to proceed with the disabling of any vital function of the aforesaid electrical apparatus. It is understood in particular that the on-site blocking process can advantageously be implemented by the proprietor of the electrical apparatus or apparatuses EA, who, upon an absence from his home for a prolonged duration, can then declare his absence to the trusted third party, the latter ensuring, by way of his request RET then by the transmission of the blocking message MVER by way of the specialized transmitter ES, the disabling of any vital function of the electrical apparatus or of the electrical apparatuses EA concerned for the duration of this absence.

Furthermore, as represented at the point (4) of FIG. 4a, the method which is a subject of the present invention can consist in periodically sending, from the specialized transmitter ES to the receiver R of the electrical apparatus EA, a message for authentication MA of the relevant specialized transmitter.

With reference to the point (1) of the aforesaid figure, it is indicated that the authentication messages MA may comprise, in the same manner as the initialization messages MID, at least the specific authorization data integrated in these same authorization data, the procedure for activating the monitoring of authorization at the level of the receiver R of the electrical apparatus EA not being run however at the level of this electrical apparatus and of this receiver upon the receipt of an authentication message. Specifically, the authentication messages MA such as described at the point (4) of the aforesaid figure may be sent with a determined periodicity or on simple request from the trusted third party ensuring the management of the method which is a subject of the invention. In particular, the authentication messages MA may be modified periodically or randomly, the specific integrated authorization data being thereby modified as a consequence, so as to ensure immunity to fraud for example.

Finally, the method which is a subject of the present invention can consist, as represented in step (5) of FIG. 4a, in sending from the electrical apparatus EA, that is to say from the localized transmitter EL with which the latter is equipped, to the receiver RES of the specialized transmitter ES, an allegiance message MAL comprising an identification code of the electrical apparatus EA.

Preferably, as represented in the aforesaid FIG. 4a, the allegiance message MAL is transmitted by the electrical apparatus EA on receipt of an allegiance request message MRAL sent from the specialized transmitter ES to the electrical apparatus EA, the allegiance message MAL thus being transmitted in response to the receipt of the allegiance request message MRAL.

Following the receipt of the allegiance message MAL by the receiver RES of the specialized transmitter ES, the latter proceeds to a verification of the aforesaid allegiance message. The verification procedure, conducted internally at the level of the specialized transmitter ES, consists essentially in verifying the value of the identification code of the electrical apparatus EA sent within the allegiance message MAL.

On positive response to the verification procedure, denoted $\Theta(MAL)$, the method which is a subject of the invention can then consist in sending, from the specialized transmitter to the receiver R of the electrical apparatus EA, in the absence of verification, this absence of verification being denoted $\Theta(MAL)=0$, a message instructing lockup of the receiver and of the electrical apparatus EA, the lockup operation being of course performed internally at the level of the aforesaid electrical apparatus.

It is understood in particular that the procedure of sending an allegiance message and of response in the absence of verification of this allegiance message is especially advantageous insofar as the concept of allegiance covers not only the proper operation of the electrical apparatus EA with regard to the specialized transmitter ES but also the monitoring of any electrical apparatus EA stolen from its legitimate owner or proprietor, and hence authorized to operate in a monitoring zone $Z_1$, and transported to a monitoring zone $Z_2$ for which the authorization monitoring parameters are different, as mentioned previously in the description. Under this last hypothesis, it is indicated that the total lockup of the electrical apparatus EA, this total lockup possibly consisting of an irreversible disabling of any vital function of the electrical apparatus EA, turns out to be a particularly good deterrent in regard to attempted theft by reason of the impossibility of use of any electrical apparatus EA thus stolen but subjected to the authorization monitoring protocol, which is a subject of the present invention.

Thus, the procedure for sending an allegiance message following receipt of an allegiance request message MRAL, as represented at the point (5) of FIG. 4a, can advantageously be systematically launched after each dispatch by the specialized transmitter ES of the initialization message MID, as represented at the point (1) of the aforesaid figure, the procedure for sending an allegiance message in this situation making it possible to ensure verification of the proper operation of the electrical apparatus EA subjected to the authorization monitoring after activation of the latter.

Furthermore, and in accordance with a noteworthy aspect of the method which is a subject of the present invention, it is indicated that the same procedure for sending an allegiance message MAL can advantageously be implemented after each sending of an authentication message MA as illustrated at the point (4) of FIG. 4a. In such a situation, the success of the sending of the allegiance message and of the verification of the latter makes it possible to verify that the electrical apparatus EA matches up with the new authentication data delivered previously by the authentication message MA to the electrical apparatus concerned.

While the procedures for sending messages requesting removal of monitoring of authorization and of sending of a blocking message, such as described and illustrated at point (2) respectively (3) of the aforesaid figure, are preferably implemented on receipt of a third party request message RET, trusted third party, the procedure for sending an allegiance message MAL may preferably be implemented on the sole initiative of the specialized transmitter ES, the latter enjoying the initiative for monitoring the allegiance of each electrical apparatus EA whose authorization monitoring it ensures. Under these conditions, apart from the transmission of an allegiance request message MRAL by the specialized transmitter ES following the sending of an initialization message MID or of an authentication message MA, it is advantageous to program the specialized transmitter ES in such a way as to send an allegiance request message and thus to run the procedure for sending allegiance messages by each relevant electrical apparatus EA periodically, so as to ensure exhaustive monitoring.

A more detailed description of a nonlimiting specific mode of implementation of the method which is a subject of the present invention when the network, to which are connected, on the one hand, the specialized transmitter ES, and on the other hand, an electrical apparatus EA equipped with a receiver R and with a localized transmitter EL, consists of the low-voltage electrical energy distribution network, LT network, will now be given in conjunction with FIG. 4b.

Represented in the aforesaid figure is a high-voltage/low-voltage transformation substation, HT/LT substation, fitted with a concentrator allowing the sending of messages by carrier currents. The low-voltage electrical energy distribution network can be subdivided into main LT network and secondary LT networks, several secondary LT networks possibly being provided, these secondary networks not being interconnected to the HT/LT substation of the main LT network. The HT/LT substation can itself be interconnected by the switched public telephone network SPTN to a management center kept by a trusted third party. On the main LT network and on each secondary LT network, denoted secondary I, secondary II, secondary III, each subscriber connected to the corresponding LT network is furnished with an electrical energy meter and of course with a communicating client interface circuit, denoted circuit ICC, connected between one of the phase conductors and the neutral of the network so as to allow the sending and receiving of messages by carrier currents. Thus, in FIG. 4b, each assembly consisting of a meter and an ICC circuit is represented by an empty circle placed on the relevant LT network. Furthermore, as represented in FIG. 4b, each branch of the LT network, main network or secondary network, can be fitted with at least one device for interfacing a low-voltage carrier currents/radio frequency bidirectional link, each device thus ensuring the bidirectional sending of messages by carrier currents by way of Hertzian space. Under these conditions, the implementation of low-voltage carrier currents/radio frequency bidirectional link interfacing devices makes it possible to ensure the bidirectional sending of the aforesaid messages under especially advantageous conditions, regardless of the number of ICC circuits connected to each branch of the network. Under these conditions, the communication messages between the concentrator of the HT/LT substation and each ICC circuit, and ultimately each subscriber, are sent with near-total transparency with regard to the information conveyed by the carrier currents. Consequently, these messages are sent by a real-time resending of any information frame conveyed by the carrier currents flowing around the LT network. The aforesaid sending of the information messages or frames or of data is then performed according to a process of repetition by ripples with allocation of transmission credit. The bidirectional character of transmission is then ensured. For a more detailed description of the mode of procedure of the bidirectional transmission of messages between an HT/LT substation concentrator and an interfacing device of a low-voltage carrier currents/radio frequency bidirectional link, reference may usefully be made to the PCT patent application WO 98/17013 entitled "Dispositif d'interfaçage d'une liaison bidirectionnelle courants porteurs basse tension/radiofréquence" [Device for interfacing a low-voltage carrier currents/radio frequency bidirectional link] published in the name of Electricité de France on 23 Apr. 1998.

Figure 4B:
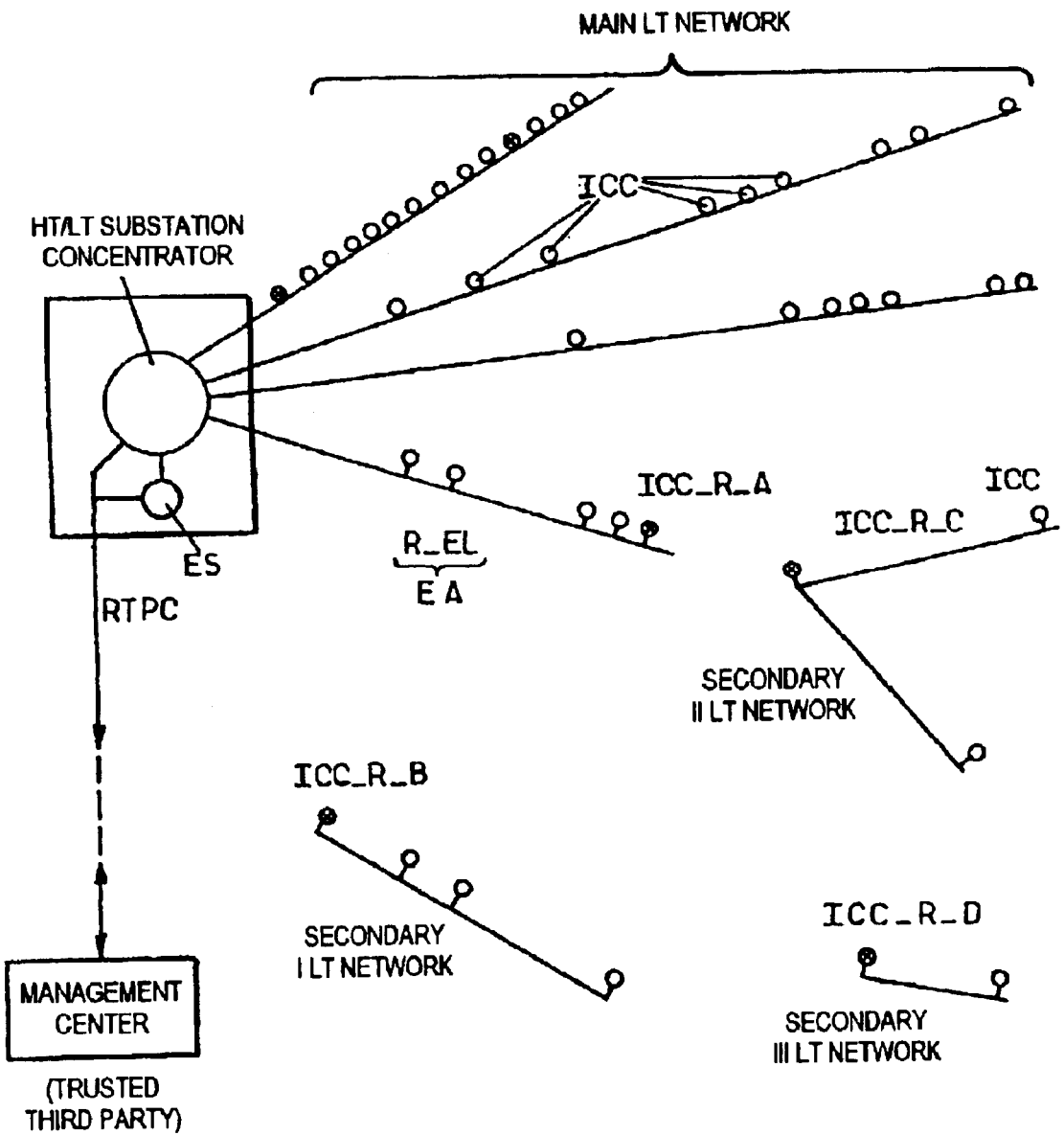
FIG. 4b represents, purely by way of illustration, a preferred embodiment of a network, of low-voltage electrical energy distribution network type, particularly adapted to the exchange of messages between a specialized transmitter and various electrical apparatuses connected to this network by carrier currents.

Under these conditions, the bidirectional exchange of messages between the specialized transmitter ES and any electrical apparatus EA fitted with a receiver R and with a localized transmitter EL can be performed in a satisfactory manner by way of the aforesaid interfacing devices, denoted ICC-R, and represented in the drawing of FIG. 4b by way of a circle comprising a cross adjoined to the branches of the LT network.

It is understood in particular that the system as a whole described in FIG. 4b allows the routing of the messages described previously in conjunction with FIG. 4a. Of course, when the specialized transmitter ES is placed at the level of the concentrator of the HT/LT substation, the management of a set of domestic electrical installations comprising a plurality of electrical apparatuses EA at the level of each subscriber can be ensured by one and the same specialized transmitter ES. Under these conditions, the specialized transmitter ES is linked directly, on the one hand, to the switched public telephone network SPTN and, on the other hand, to the LT network by way of an interfacing device of a low-voltage carrier currents/radio frequency bidirectional link, such as described previously in the description.

A more detailed description of specific applications of the method which is a subject of the present invention to various service provisions will now be given in conjunction with FIGS. 5a and 5b.

Figure 5A:
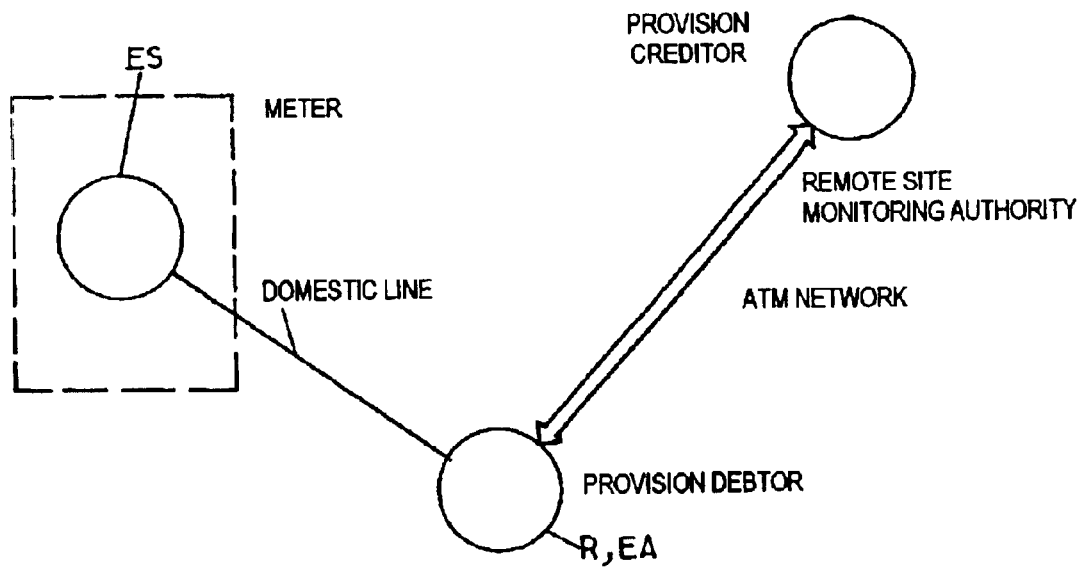
FIG. 5a represents, by way of illustration, an exemplary implementation of the protocol which is a subject of the present invention within the framework of a service provision application such as teleworking, a specialized transmitter being installed and connected to the low-voltage electrical energy distribution network, at the level of the electrical energy distribution meter, the electrical apparatus of the subscriber to the electrical energy distribution service and to the teleworking service, of which the latter is debtor, consisting of a computer linked by an ATM network for example to a remote site playing the role of authority for monitoring the teleworking service provision or at the very least of creditor of this service provision.

FIG. 5a relates to a first exemplary implementation of a specialized transmitter ES and of the method which are the subject of the present invention when the electrical apparatus EA fitted with a receiver equips an electrical apparatus of a provision debtor. In the example given in relation to the aforesaid figure, the electrical apparatus EA consists of a microcomputer and the provision debtor user is required to effect home teleworking provisions for example, in respect of a creditor situated at a remote site and possibly constituting a monitoring authority. The constituent microcomputer of the electrical apparatus EA subjected to the protocol which is a subject of the present invention can then be linked to the remote site of the monitoring authority by way of an ATM network or the INTERNET network for example.

In particular, the specialized transmitter ES, in this application, can periodically transmit an authentication message MA to the receiver R, this authentication message possibly allowing the provision debtor service provider to prove to the remote site, that is to say to the creditor of the provision, that access actually takes place from the normal place of work agreed by the monitoring authority.

The mode of procedure of the assembly is described hereinbelow.

Like any piece of equipment, that is to say any electrical apparatus EA connected to the electrical energy distribution network, the microcomputer constituting the workstation of the provision debtor receives the periodic messages delivered by the specialized transmitter ES.

As soon as the microcomputer constituting the workstation connects to the remote site, and after an identification process, the microcomputer is able to send to the remote site all or some of the content of a message received from the specialized transmitter ES.

Such a process allows the implementation of the operations hereinbelow:

Verification of the Authentication of the Specialized Transmitter ES by the Remote Site:

The remote site must normally possess the public key $K_{ACPU}$ of the certifying authority used by the specialized transmitter ES. Consequently, by a method analogous to that carried out by the receiver R of an electrical apparatus EA, on receipt of a message MI as described previously, the remote site is able to authenticate the message sent by the microcomputer of the provision debtor as originating from the specialized transmitter ES, as the case may be from the meter identified in the message when the specialized transmitter ES is associated with a meter. The remote site can moreover verify the association of the identity of the user, that is to say of the provision debtor, and of the specialized transmitter ES or of the electrical energy meter associated with the latter.

In the case where the remote site does not possess the public key $K_{ACPU}$ of the certifying authority, and in the case where the remote site accepts the risk, it can then use that key contained in the message or the message part delivered by the specialized transmitter ES and resent by the microcomputer of the provision debtor. This public key $K_{ACPU}$ of the certifying authority can thus be stored and then subjected to verification and/or reuse subsequently at the level of the remote site. The risk in the acceptance of the public key $K_{ACPU}$ contained in the message delivered by the specialized transmitter ES resides in the fact that a message manufactured by a false certifying authority may be accepted as valid. This risk must be borne by the security policy of the remote site accessed, which must rule on the fate to be reserved for this mode of procedure, that is to say choose either rejection, or acceptance with alarm or else acceptance with request of confirmation for example.

Sending of the Message Coming from the Specialized Transmitter ES:

The procedure for authenticating the identity of the provision debtor at the remote site can explicitly envisage the dispatching of the message originating from the specialized transmitter ES instead of or as a supplement to conventional authentication.

This mode of procedure leads in principle to the modifying of the authentication protocols existing in the state of the art. However, in order to route the authentication message transmitted by the specialized transmitter ES within an existing protocol, it is possible to envisage adjoining this message to another protocol message transmitted from the workstation of the provision debtor to the remote site. In particular, in a mode of authentication by password, it is possible to send either this authentication message delivered by the specialized transmitter in place of the password, or this authentication message affixed to this password or else a combination according to a preestablished convention of both of the passwords and of the message delivered by the specialized transmitter ES.

A second application of the method which is a subject of the present invention will now be described in conjunction with FIG. 5b.

This application can be implemented when using a specialized transmitter ES in the new modes of sale of electrical energy for example or of any other fluid supplied through a fixed network by way of a meter.

Figure 5B:
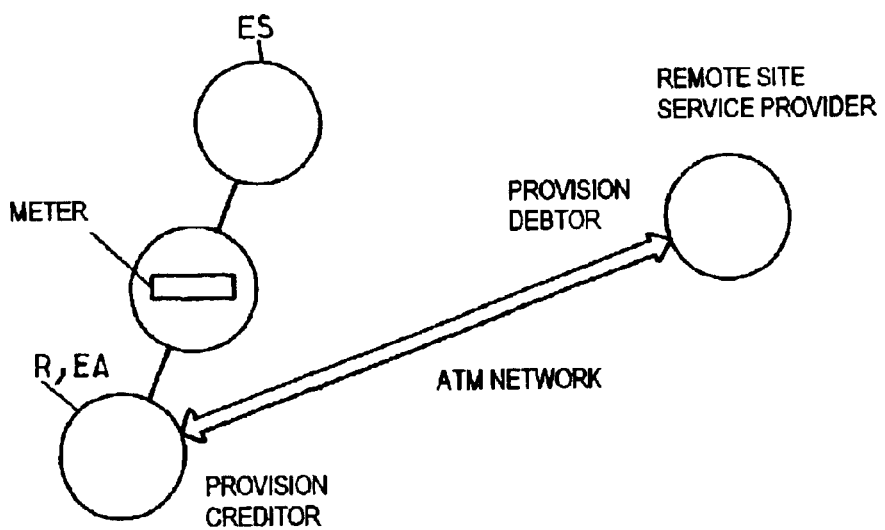
FIG. 5b represents, by way of illustration, an exemplary implementation of the protocol which is a subject of the present invention within the framework of a service provision application, such as a remote intervention, a specialized transmitter being installed and connected to the low-voltage electrical energy distribution network, at the level of the electrical energy distribution meter of the subscriber to the remote intervention service, of which the latter is creditor, and consisting of any electrical apparatus catering for this remote operation, an operation such as periodic remote reading of the consumption of this electrical apparatus, maintenance intervention when this apparatus is a computer apparatus, this apparatus being linked to a site remote from the service provider by an ATM network for example.

As represented in FIG. 5b, the subscriber to the service for distribution and sale of energy, electrical energy for example, is furnished with electrical apparatuses EA with which at least one receiver is associated. The electrical apparatus EA is interconnected to the low-voltage electrical energy distribution network by way of a branch-line and of a meter making it possible to deliver electrical energy to each electrical apparatus EA in the user's domestic installation. The user is in this case the provision creditor.

In a conventional manner, the supplying of fluids through a distribution network is metered at the point of delivery by virtue of the aforesaid meter. The bill to the subscriber, that is to say to the provision creditor, is invoiced as a function of the consumption at the meter and of the tariff associated with his contract of supply. Within the framework of a free market economy, the provision of distribution services, ensured by the manager of the network, and of supply services, ensured by the producer or the packager of the fluid, are separate. The same point of delivery may be the place of supply originating from different suppliers. By way of nonlimiting example, the provision of service carried out by various telecommunication operators from one and the same telephone line is indicated. Under these conditions, distinct supplies are apparent according to the uses. Such a situation occurs when marketing electrical apparatuses associated with an electrical energy supply contract. The electrical energy supply is then billed on the basis of specialized metering or of a flat rate. Authentication of the location of the supply with respect to a given point of delivery is then necessary.

With this aim, and as represented in FIG. 5b, the specialized transmitter ES makes it possible to ensure this authentication by broadcasting the locating message to each supplier's own meters and equipment.

The relevant supplier can then define his tariff conditions applicable as a function of the location and of contracts taken out individually with the creditor of the provisions. The balance between energy delivered at the point of delivery and energy supplied to the customer can then be established with certainty. Under these conditions, the mode of communication of the specialized transmitter ES with each electrical apparatus EA is comparable to that described within the framework of FIG. 5a, although the provision creditor is now the user and the provision debtor is the remote site providing the service organized for the distribution of electrical energy or the like. Under these conditions a link by ATM or INTERNET network for example can be effected between the site of the provision creditor and the remote site of the service provider.

Furthermore, FIG. 5b corresponds also to a similar situation in which a teleservice is executed from a remote provision debtor site, the provision creditor being any user of an electrical apparatus EA fitted with a receiver connected for example to the electrical energy distribution network.

In a general manner, the teleservice in such a situation is an action conducted remotely by the service provider on the customer's installation in the absence, usually, of any intervention by this customer.

To execute the aforesaid service, the provider must however ensure that an intervention at the customer's correct address is involved. To bill his service, the provider must establish that he has indeed intervened remotely on the customer's installation and he must of course give proof of the duration of the intervention and of the date of the latter. In both cases, the provider must impose a certain degree of guarantee on the actual location of the installation on which he intervenes and on the reality of the intervention.

In such a situation, while the provision can be effected by the service provider by way of the INTERNET or ATM network for an intervention on a computer for example, as soon as the intervention begins, the computer which is the subject of the intervention, that is to say the electrical apparatus EA constituted by this computer, dispatches to the service provider on the remote site the authentication message transmitted by the specialized transmitter ES installed in the vicinity of the latter, that is to say in the vicinity of the meter when the electrical installation is concerned. The service provider can thus verify the authenticity of the message received and provide proof in particular of the duration of intervention, of the date, for example. The mode of communication of the specialized transmitter ES is then comparable to that described within the framework of FIG. 5a.

A more detailed description of a specialized transmitter, respectively of a receiver associated with an electrical apparatus connected to a network in accordance with the subject of the present invention, this specialized transmitter device and this receiver device described previously in the description of course allowing the implementation of the method which is a subject of the invention, will now be given in conjunction with FIGS. 6a, 6b and 7a, 7b.

In a general manner, it is indicated that in the simplest version allowing the implementation of a monodirectional communication, between the aforesaid specialized transmitter and a receiver associated with an electrical apparatus connected to a given network, the specialized transmitter, as represented in FIG. 6a, can be constructed in the form of a piece of monoblock equipment of small size, not exceeding that of a cube of side 20 cm approximately.

Under these conditions, as represented in FIG. 6a, the specialized transmitter ES can comprise, in addition to an external electrical energy supply, denoted $AL_1$, an electronic card 1 comprising a calculation unit, or microprocessor, denoted $\mu P$ and bearing the reference $1_0$, as well as, for the implementation of the signature and certificate calculations, either of a coprocessor bearing the reference $1_1$, or of a read only memory of ROM type connected to the aforesaid microprocessor $1_0$. The processor $1_0$ and the coprocessor or the read only memory $1_1$ are linked by way of an internal BUS $1_2$ to a work memory denoted $1_3$. The work memory can consist of a RAM memory in which the signature calculation and verification programs can be loaded from the ROM memory $1_1$ for the implementation of the signature calculation and verification operations for example.

Furthermore, the specialized transmitter ES comprises a unidirectional communication unit bearing the reference $1_4a$ and a transmitter module proper, bearing the reference $1_5a$, this transmitter module, as a function of the application carried out and of the type of communicating network used, being able to consist of a Hertzian transmitter, or on the contrary of a transmitter by carrier current on the low-voltage electrical energy distribution network for example. The unidirectional communication unit $1_4a$ is interconnected to the internal BUS $1_2$ as well as to the transmitter module $1_5a$. This transmitter module is itself linked to an antenna when the transmitter is a Hertzian transmitter or respectively to the electrical network by a connection module $1_6$ when the transmitter is a carrier current based transmitter.

It is of course understood that, on calling the programs, intended for the electrical apparatus, for calculating the signature and the coded values for constructing the coded authorization information item, these programs being stored in the ROM type memory $1_1$, the signature calculation and verification operations can be performed from the work memory $1_3$ and from the calculation unit, the microprocessor $1_0$. The coded values making up the coded authorization information item are then sent to the unidirectional communication unit $1_4a$ so as to construct coded information messages, that is to say messages comprising the aforesaid coded authorization information item. The transmission of these messages is then carried out by the transmission module $1_5a$, either in Hertzian form, or in carrier current form by way of the antenna or of the module for connection to the low-voltage network $1_6$.

Preferably, and in a specific embodiment represented in FIG. 6a, the specialized transmitter ES furthermore comprises an external computer socket, denoted $1_7$, allowing the interconnection of the specialized transmitter device with an external device for metering fluid or energy, denoted CO. The external computer socket can be embodied, by way of nonlimiting example, by an RS232 serial link for example. Furthermore, a linking module $1_8$ constituting a unit for communication with the meter CO is provided between the external computer socket $1_7$ and the calculation module consisting of the microprocessor $1_0$, the signature calculation coprocessor $1_1$ or the corresponding ROM memory, and the random access memory $1_3$. This link is ensured by the internal BUS $1_2$. Thus, the aforesaid calculation module and in particular the microprocessor $1_0$ receives from the fluid or energy meter CO a metering information item making it possible to code the authorization monitoring code so as to constitute the information messages sent.

Represented in FIG. 6b is a specialized transmitter allowing a bidirectional link with the electrical apparatus EA subjected to the authorization monitoring when the receiver R associated with this electrical apparatus is itself equipped with a transmitter module.

In such a case, the specialized transmitter ES can then be embodied in the form of a dedicated card associated with a computer.

In FIG. 6b, the same references denote the same elements as in FIG. 6a. However, the communication unit bears the reference $1_4b$ to denote a bidirectional communication unit allowing the selection of the mode of procedure of the specialized transmitter either as transmit mode, or as receive mode. In the same manner, the transmission module bears the reference $1_5b$, this transmission module being moreover equipped with a Hertzian reception module or a carrier current based reception module. Thus, as a function of the mode of procedure adopted, in particular for the exchanging of bidirectional messages, as represented previously in the description in FIG. 4a, the switch from the transmit mode to receive mode is carried out by way of the microprocessor $1_0$ and of a specific program.

In the case of FIG. 6b, the specialized transmitter can be fitted with more specific elements customarily implemented for the equipping of microcomputers such as a display screen with graphics card, bearing the reference 3, a keyboard bearing the reference 4 and a modem bearing the reference 5, so as to ensure interconnection with the switched public telephone network SPTN previously mentioned in the description.

In the embodiment represented in FIG. 6b, it is indicated moreover that the meter CO can be integrated directly into the constituent dedicated card 1 of the specialized transmitter ES. In this case, with the meter CO consisting of a specific metering unit, is associated a measurement sensor directly connected to the fluid or energy distribution network such as the electrical network for example. The measurement sensor bears the reference 8.

Finally, another specific function can be implemented, this function possibly consisting of an alarm system comprising an external alarm, bearing the reference 7, linked to an acquisition and alarm link card, bearing the reference 6. The external alarm module 7 is linked to the internal BUS $1_2$ by way of the acquisition and alarm link card 6.

The architecture of a receiver R associated with an electrical apparatus in accordance with the subject of the present invention, will now be described in conjunction with FIGS. 7a and 7b.

The embodiment of FIG. 7a is a minimum embodiment more especially intended for electrical apparatuses which do or do not comprise a function for intelligent management of the functions of the electrical apparatus by microprocessor. This receiver can then be implemented on a specific electronic card powered by an external power supply $AL_2$ or, as the case may be, by the power supply to the electrical apparatus for example.

In FIG. 7a, the components consisting of the microprocessor $2_0$, the coprocessor or the ROM read only memory $2_1$, the internal BUS $2_2$, the random access memory $2_3$ are added to the dedicated electronic card, the processor $2_0$, the internal BUS $2_2$ and the memory $2_3$ possibly consisting however of those of the electrical apparatus EA, when the latter consists of a microcomputer for example in the application to teleworking, as described previously in the description.

The receiver represented in FIG. 7a furthermore comprises a module for receiving the coded information messages essentially comprising a unidirectional communication unit $2_4a$, a Hertzian type receiver or carrier current based receiver, bearing the reference $2_5a$, and an external antenna or a module for connection to the electrical network in the case where the reception is ensured by carrier current, this antenna or this connection module bearing the reference $2_6$. The elements $2_6$, $2_5a$ and $2_4a$ are connected in cascade, the unidirectional communication unit $2_4a$ being itself interconnected to the internal BUS $2_2$.

As will be observed moreover in FIG. 7a, the receiver device R comprises a module for decoding and verifying the coded authorization information item contained in each information message received. This decoding and verification module advantageously consists of the calculation microprocessor $2_0$, of course the RAM type work memory $2_3$ as well as the coprocessor or the ROM memory bearing the reference $2_1a$ in which are stored the signature calculation and verification programs, as was mentioned previously in the description.

Furthermore, a module for instructing authorization or nonauthorization of the electrical apparatus EA as a function of the verification of the coded authorization information is also provided. This module consists of the microprocessor $2_0$, a ROM read only memory bearing the reference $2_1b$ and of course the work memory $2_3$. This instruction module is supplemented with a computer socket bearing the reference $2_7$ making it possible to dispatch instruction commands to the electrical apparatus EA and in particular to vital functions thereof. The socket $2_7$ can, for example, consist of a serial link type socket, which makes it possible to route messages for instructing blocking i.e. irreversible incapacitating of vital functions of the electrical apparatus subjected to the authorization monitoring, as described previously in the description in conjunction with FIG. 4a.

The ROM memory $2_1b$ can advantageously comprise the set of blocking or irreversible incapacitating instruction programs intended for the electrical apparatus EA.

Represented in FIG. 7b is a receiver associated with an electrical apparatus in which the same references represent the same elements as in the case of the embodiment of FIG. 7a. However, this receiver is a more elaborate receiver, which allows the implementation of a bidirectional link between the specialized transmitter and the receiver associated with the electrical apparatus EA. The differences with regard to the embodiment of the receiver represented in FIG. 7a relate to the communication unit, bearing the reference $2_4b$, which is a bidirectional communication unit, and the Hertzian receiver module, bearing the reference $2_5b$, this module now being equipped with a transmitter. The receiver transmitter module $2_5b$ then consists either of a Hertzian or carrier current based receiver/transmitter module.

What is claimed is:

1. A method for monitoring authorization of an electrical apparatus connected to a network, on the basis of a specialized transmitter of information messages, this electrical apparatus being equipped with a receiver of information messages, the method comprising:

sending from the specialized transmitter to said electrical apparatus a coded information message comprising at least one coded authorization information item dependent on an authorization monitoring code;

receiving said information message by means of said receiver with which said electrical apparatus is equipped;

decoding said coded information message as a function of specific authorization data integrated into said receiver so as to generate decoded authorization information;

instructing the authorization of said electrical apparatus if said decoded information satisfies said specific integrated authorization data;

instructing the non-authorization of said electrical apparatus otherwise, wherein said method further comprises the step of sending, on request of said receiver, from the transmitter to said receiver, an authorization monitoring removal message, said receiver, on receipt of said authorization monitoring removal message being reset to unrestricted operation.

2. The method as claimed in claim 1, wherein said authorization monitoring code comprises at least one field containing a numerical value representative of a geographical location of said electrical apparatus belonging to an authorization monitoring zone.

3. The method as claimed in claim 1, wherein said authorization monitoring code comprises at least one field containing a numerical value representative of a condition undersigned by the user.

4. The method as claimed in claim 1, wherein it comprises the step of periodically sending said coded information message to said electrical apparatus.

5. The method as claimed in claim 1, wherein said network consists of one of the networks from the group local computer network, extended computer network, the local Hertzian network, the cellular radio telephony network, the electrical energy distribution network equipped with sending of messages by carrier currents.

6. The method as claimed in claim 1, wherein each information message comprises at least one data field representative of a duration of authorization of said electrical apparatus.

7. The method as claimed in claim 1 wherein each message is signed, each signed message comprising a field of signed authentication data, making it possible upon verification of signature to decide whether said verified and decoded information satisfies said specific integrated authorization data.

8. The method as claimed in claim 7, wherein said data comprise at least one monitonic increasing time-dependent value making it possible to avoid fraudulent replay.

9. The method as claimed in claim 1, wherein it furthermore comprises steps for managing the monitoring method comprising at least one of the following steps:
   sending from the specialized transmitter to said receiver an initiation message comprising at least said specific integrated authorization data;
   sending to said receiver, on request of a third party element belonging to said monitoring perimeter and ensuring surveillance of this monitoring perimeter, a message of on-site blocking of said electrical apparatus, said on-site blocking message causing the disabling of any vital function of said electrical apparatus;
   periodically sending said receiver a message for authentication of said transmitter;
   sending from the receiver to the transmitter an allegiance message, comprising an identification code of said receiver;
   sending from the transmitter to the receiver, in the absence of verification by the transmitter of said allegiance message, a message instructing lockup of said receiver.

10. The method as claimed in claim 6, wherein, for an electrical energy distribution network equipped with sending of messages by carrier currents, said transmitter is placed on a site of this network of the type of an HT/LT transformer, meter of consumption at a subscriber's premises.

11. The method as claimed in claim 10, wherein said information messages comprise at least one data field representative of an identification code of the HT/LT transformer, or of the consumption meter.

12. The method as claimed in claim 10, wherein said information messages comprise at least one data field representative of the metering value of said consumption meter.

13. A specialized transmitter device for monitoring authorization of an electrical apparatus connected to a network, said specialized transmitter being adapted to allow the sending, to an electrical apparatus being equipped with a receiver of information messages, of a coded information message comprising at least one coded authorization information item for said electrical apparatus dependent on an authorization monitoring code, said specialized transmitter device comprising at least:
   means for calculating an authorization monitoring code associated with at least one electrical apparatus;
   means for transmitting on said network coded information messages containing said coded authorization information item dependent on this authorization monitoring code,
wherein it further comprises means for sending, on request of said receiver, from the transmitter to said receiver, an authorization monitoring removal message, said receiver, on receipt of said authorization monitoring removal message being reset to unrestricted operation.

14. The device as claimed in claim 13, wherein it furthermore comprises:
   an external computer socket allowing the interconnection of said device with a device for external metering of fluid or energy;
   a linking module interconnected between the external computer socket and said means for calculating a monitoring code, said means of calculation receiving from said fluid or energy meter a metering information item making it possible to code said authorization monitoring code.

15. A receiver device equipping an electrical apparatus connected to a network, said receiver being arranged for receiving from a specialized transmitter coded information messages comprising at least one coded authorization information item for said electrical apparatus, said receiver comprising at least:
   means for receiving said coded information messages;
   means for decoding and verifying said coded authorization information item;
   means for instructing authorization respectively nonauthorization of said electrical apparatus as a function of the verification of said coded authorization information item,
wherein it further comprises:
   means for sending a request of authorization removal message, and
   means for, on receipt of said authorization monitoring removal message, resetting the receiver device to unrestricted operation.

16. The receiver device as claimed in claim 15, wherein, said means of transmission of the specialized transmitter being equipped with a receiver and said means of reception of the receiver associated with the electrical apparatus being equipped with a transmitter, the communication between the specialized transmitter and the receiver associated with the electrical apparatus is bidirectional.

* * * * *